Nov. 30, 1971  E. L. HOOVER  3,623,242

ELECTRONIC TEACHING SYSTEM

Filed Oct. 15, 1970  4 Sheets-Sheet 1

INVENTOR
EDWIN L. HOOVER
BY
ATTORNEYS

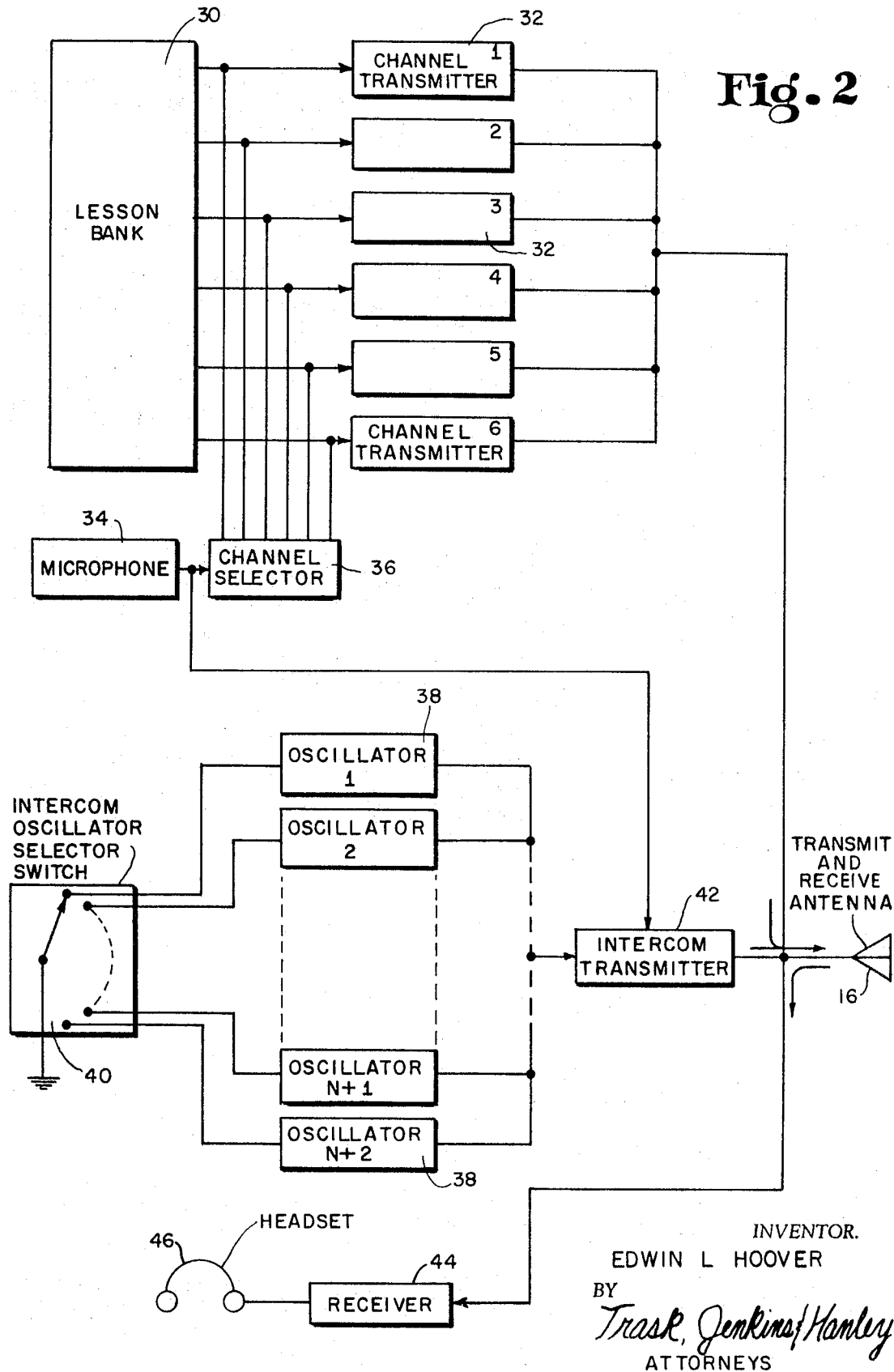

INVENTOR.
EDWIN L. HOOVER
BY
Trask, Jenkins & Hanley
ATTORNEYS

United States Patent Office 3,623,242
Patented Nov. 30, 1971

3,623,242
ELECTRONIC TEACHING SYSTEM
Edwin L. Hoover, Dayton, Ohio, assignor to Duncan Electric Company, Inc., Lafayette, Ind.
Continuation-in-part of application Ser. No. 778,040, Nov. 22, 1968. This application Oct. 15, 1970, Ser. No. 81,090
Int. Cl. G09b 5/04
U.S. Cl. 35—35 C
13 Claims

ABSTRACT OF THE DISCLOSURE

A teaching system in which there is provided an instructor's console and a plurality of student stations. The console is provided with a plurality of lesson sources which are selectively transmitted to and received by the student stations. The student stations also have means for connecting a plurality of lesson sources directly thereto. Said console and stations are also provided with means for providing an intercom link selectively actuatable for connection between said console and any one or all of said student locations whereby an instructor at said console can monitor and converse with any one or all of the students at said stations. Means are also provided at each station whereby any student can, in addition to conversing with the instructor, hear his voice projected into the system.

---

This is a continuation-in-part of my co-pending application Ser. No. 778,040, filed Nov. 22, 1968, and now abandoned.

BACKGROUND OF THE INVENTION

Some educational courses, such as music, secretarial subjects, and languages are especially adapted for teaching by recorded lessons. Such recorded lessons give the instructor a degree of free time for monitoring the progress of the various students. Some of the desirable features in this type of learning system include the capability of transmitting several lessons simultaneously with the reception of such lessons being selected at the student stations. A pair of earphones are provided at each student station so that a student may listen to one lesson and not disturb students occupying adjacent stations. Each student receiver should have a plug-in jack, so that the instructor may monitor a lesson at a particular student station and interject comments into the audio system of the student station so that the student and teacher may converse about the lesson at each station. Desirably, however, it should not be necessary for the instructor to have to walk around to the various stations in order to converse with or monitor the progress of a particular student, and the teacher should be able to perform such monitoring from a central location such as the control console for the system. It is not desirable, however, for each student station to have a separate transmission frequency since this would complicate the reception circuitry of the console. In addition, it is desirable that the instructor may converse with a single student without interrupting the other students in the classroom who may or may not be using the same lesson as the student being monitored.

It is an object of this invention, therefore, to provide such a teaching system wherein the intercom link permits the instructor to monitor or converse with any individual in the transmitting area.

SUMMARY OF THE INVENTION

In accordance with one form of the invention, there is provided a wireless teaching system including an instructor's receiving and transmitting console and a plurality of student receiving and transmitting stations. A plurality of transmitters are provided at the console with each being connected to a different lesson source. The transmitters, whose frequencies differ from each other, have their outputs coupled together and applied to a single antenna. The output of a microphone at the console can be coupled to any or all of the lesson transmitters so that the instructor can make comments to the students during the lesson transmissions. A plurality of oscillators, one for each student station, are connected to a selector switch at the console. The oscillators are connected to a common transmitter, with the output of the instructor's microphone being connected to said transmitter for modulating the selected oscillator signal.

Each of the student stations is provided with a receiving antenna, RF amplifier, and lesson detecting circuitry coupled to an audio amplifier for application to a headset to permit the student to receive the signals transmitted from the lesson transmitters. The student station also has means to connect to it a second series of lesson sources which can be listened to instead of those at the instructor's console. A microphone is connected to the audio amplifier to permit the student to hear himself over the headset. Another RF amplifier couples the incoming signal from the console oscillator transmitter to an intercom detector having its output applied through a gate to the audio amplifier. The student microphone also has its audio output coupled through the student amplifier to a transmitter. In this manner, the instructor and student can have a two way conversation. The open or closed condition of the gate is controlled by a filter which passes the frequency signal of the associated console oscillator so that only the intercom circuitry at the student station selected at the console is energized and all audio signals to the student headset at that station, including the output of the student microphone, are applied through the student transmitter.

BRIEF DESCRIPTION OF THE DRAWINGS

The accompanying drawings illustrate the invention. In such drawings:

FIG. 2 is a block diagram of the control console shown in FIG. 1;

DETAILED DESCRIPTION OF THE PREFERRED EMBODIMENT

Figure 1:
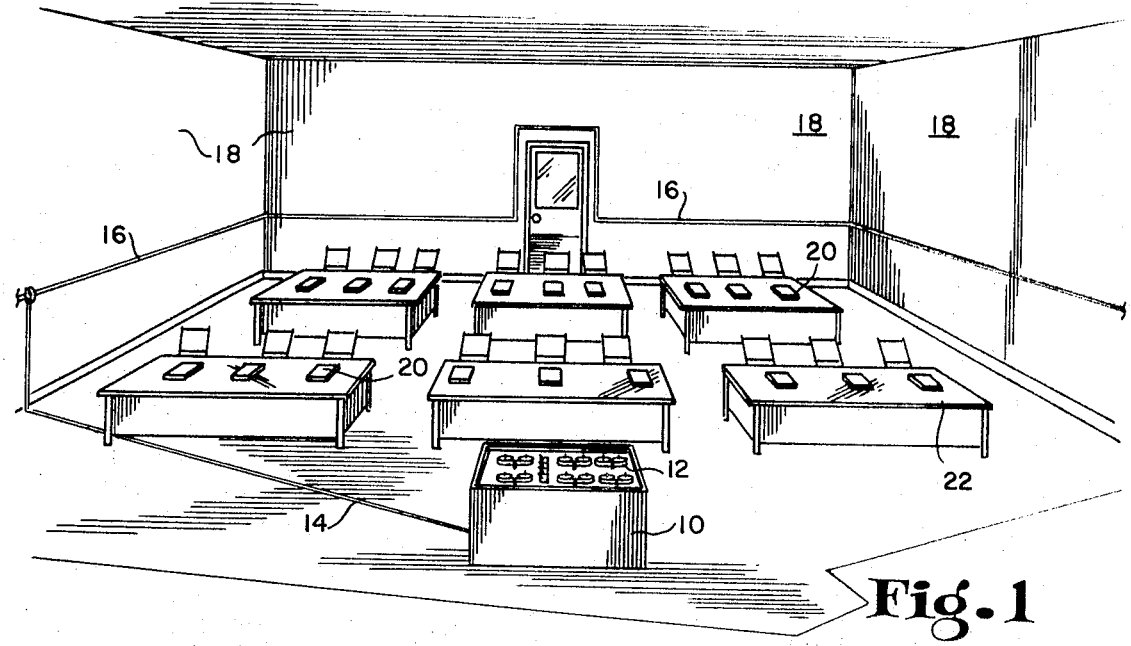
FIG. 1 is a perspective view showing a teaching system embodying the invention.

In my electronic teaching system, as depicted in FIG. 1, there is provided an instructor's console 10 having a plurality of tape decks 12 mounted thereon to provide a source of recorded lessons. The tape decks 12 are connected to transmitters in the console 10 which have their outputs connected together and through a conductor 14 to an antenna 16 attached to the walls 18 of the classroom to form a continuous loop antenna. Conveniently, the antenna 16 may be formed of a four conductor, adhesive backed, flat cable, such as telephone hook-up wire, taped to the wall to form said continuous loop.

A plurality of student receiver-transmitters 20 are placed on tables or desks 22 about the room. RF transmissions between the console 10 and the receiver-transmitters 20 permit the system to be used as a lesson source where lessons are transmitted from the console to the student stations, and said transmissions also permit the teacher to give instructions through the RF link to all the students in the room or to those students listening to the same lesson.

Furthermore, an intercom system permits the instructor to converse with any one student while not disturbing the remaining students.

The circuitry included in the console 10, as shown in FIG. 2, includes a bank 30 of lesson sources comprising the tape decks 12 or other sound reproducing means such as phonographs, etc. The lesson sources are coupled to a plurality of individual transmitters 32, each operating on a different frequency or channel to supply electrical signals to the antenna 16. The console has provisions to receive a plug-in microphone 34 allowing the instructor to inject his comments on the carrier frequencies of the various transmitters 32. The microphone 34 is coupled through a channel selector 36 which connects the microphone to any one of the lesson channels or simultaneously to all of them. This feature is especially useful in a music class where the teacher may call attention to specific portions of the music lesson being transmitted.

It has been found desirable to assign carrier frequencies to the various channels 32 at intervals beginning at about 150 kHz. (kilocycles per second) and ending at about 350 kHz. Frequencies in this approximate range are low enough so that the student receivers need not have local oscillator stages therein, but may detect the audio signal directly.

In the equipment as it has been discussed to this point, the instructor may talk to any group of students listening to any one channel of the console, but he can not hear any comments made by the students. However, the system also includes an intercom portion which comprises a group of oscillators 38 connected for actuation to a selector switch 40 which energizes any one of the oscillators to apply its frequency to a transmitter 42. There is one oscillator 38 for each student receiver which is adapted to be linked with the console. The microphone 34 is connected to the transmitter 42 to modulate the selected oscillator signal, so that the instructor may speak to the student at the selected station; and, so that the student's voice may be transmitted from the student station, picked up by the antenna 16 and applied through a console receiver 44 to a console headset 46 to complete the intercom loop.

Figure 3:
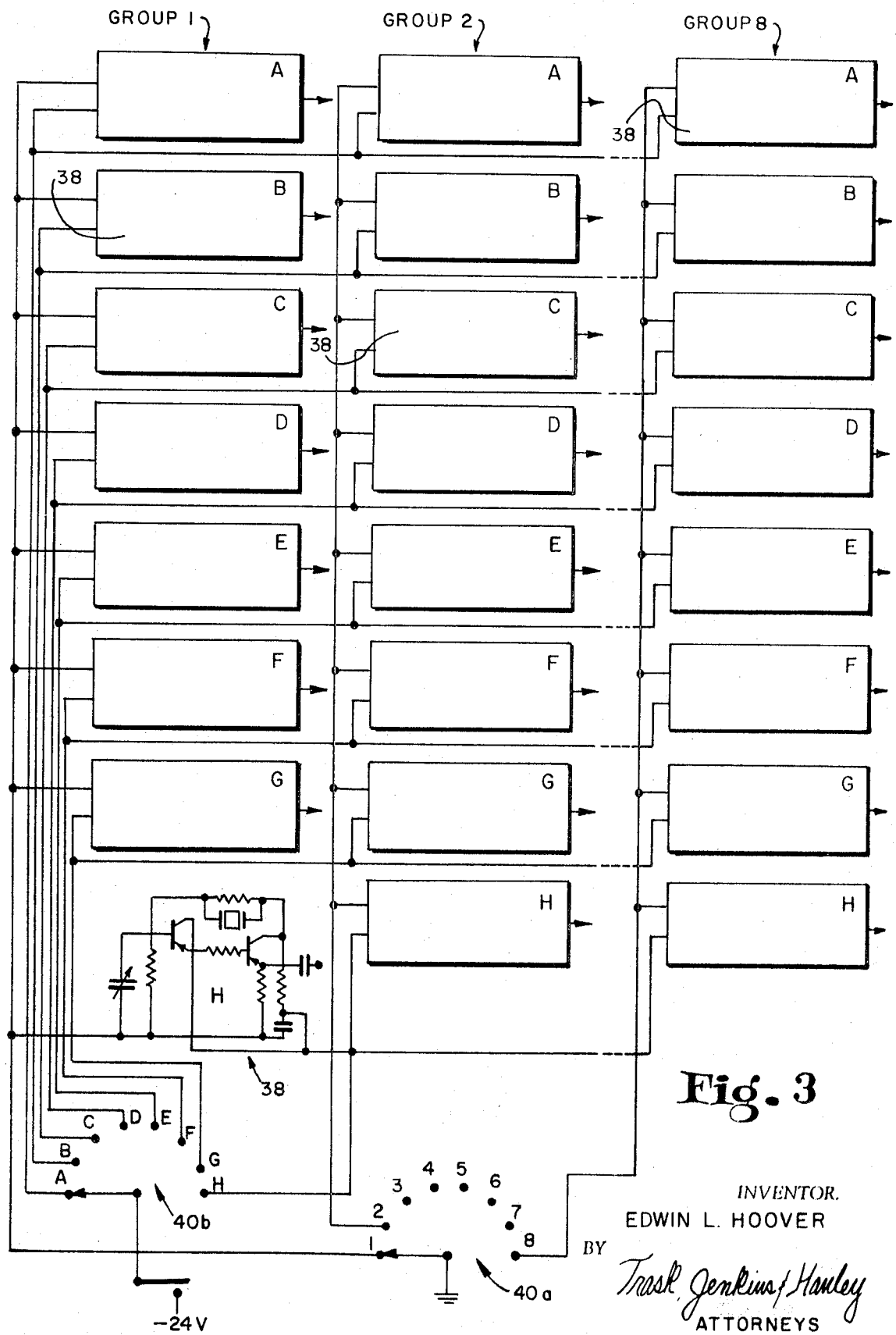
FIG. 3 is a schematic diagram of the selector switch and oscillators shown in FIG. 2.

Desirably, the selector switch 40 comprises two 8-position switch sections 40a and 40b having rotatable wiper arms connected respectively to ground and to a negative voltage. Each oscillator 38, as shown, in FIG. 3, has its ground lead and negative supply lead connected to one of the contacts on the 8-position switch sections. This arrangement permits the operator to manipulate the two switch sections to energize any one of 64 oscillators which are divided into eight groups, each group comprising eight oscillators designated A through H. All of the oscillators of any one group have their ground leads connected to a respective contact on the grounded switch 40a. As for example, the oscillators of group 1 are connected to contact 1 on the switch, and those in group 2 are connected to contact 2, etc. Similarly, all of the A oscillators are connected to contact A on the switch section 40b, and so on, with the result that the 64 oscillators can be designated by the position corresponding to the switch positions necessary to energize them. Although the preferred embodiment of frequency selection for the intercom portion has been shown and described, it may be found desirable to switch crystals in and out of a single oscillator circuit, rather than switch the oscillators themselves.

Figure 4:
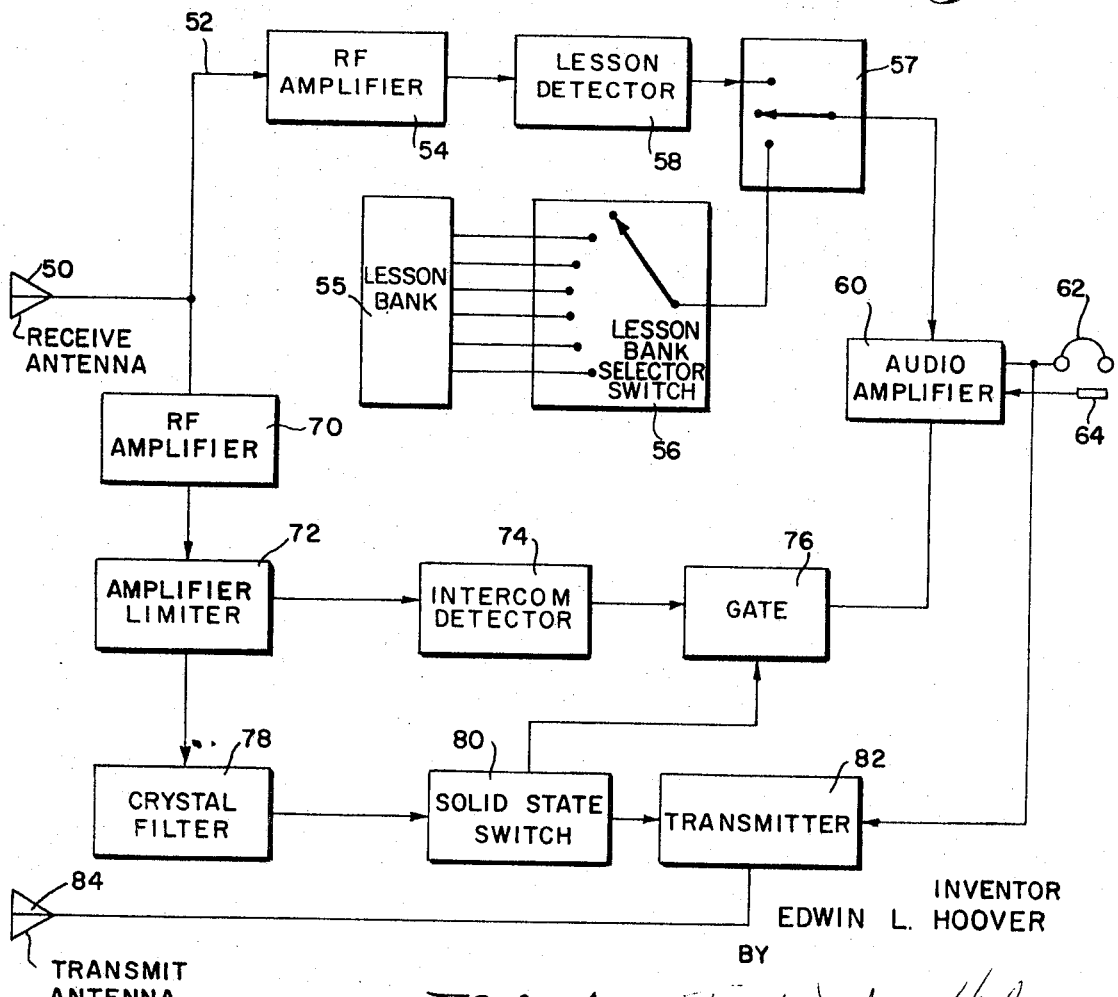
FIG. 4 is a block diagram of a student receiver-transmitter, as shown in FIG. 1.
Figure 5:
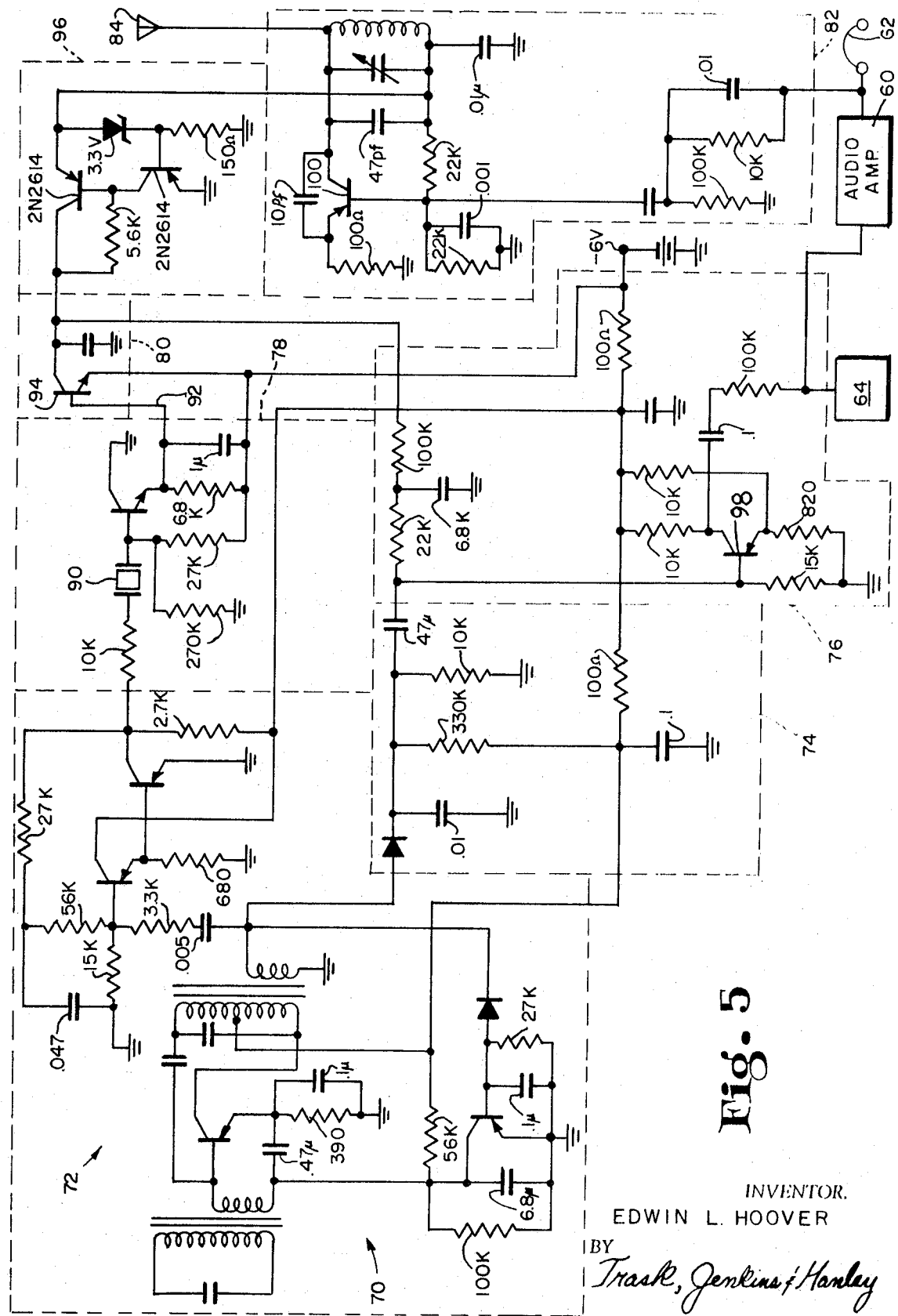
FIG. 5 is a combined schematic and block diagram of the intercom portion of a student receiver-transmitter.

Each student station, as shown in FIGS. 4 and 5, is provided with a receiver-transmitter assembly having a receiving antenna 50 connected by a conductor 52 to an RF amplifier 54. The RF amplifier has its output connected to a lesson detector 58 for returning the lesson signal, which originated at the lesson bank at the instructor's console, to an audio frequency signal. If the lesson transmitters 32 in the console 10 operate in the area of the frequency band discussed above, then there is no need for a local oscillator, mixer, or IF amplifier and the signal may be coupled by the conductor 52 from the RF amplifier 54 directly to the lesson detector 58. The output of the lesson detector 58 is coupled through a lesson bank selector switch 57 and an audio amplifier 60 to an audio transducer such as a headset 62. The selector switch 57 is used by the student to select lessons from either the instructor's console lesson bank or a lesson bank 55, conveniently in the form of a tape deck, at the student's station. The lesson bank 55 may be provided with a selector switch 56, a plurality of individually insertable tape cartridges, or the like to permit the student to select the desired lesson from his own lesson bank.

A student microphone 64 is coupled through the audio amplifier 60 to the headset 62 so that the student may hear his own voice even though the headset prevents him from hearing other external sounds. This is especially important in a language lesson where the student listens to the pronunciation of a phrase and then repeats it out loud to compare his pronunciation with that of the lesson source. The RF amplifier 54 is tunable to select one of the lesson transmitter frequencies from the console 10. Thus, any lesson channel 32 can be chosen by the RF amplifier 54 for detection by the circuit 58.

The receiver-antenna 50 is also connected to an RF amplifier 70 which has its output connected to an amplifier limiter circuit 72 which amplifies and limits the amplitude of the frequency signal received from the intercom transmitter. The amplifier limiter 72 has two outputs: an amplifier output which is coupled to a detector 74 for detecting any audio signal being carried on the signal of one of the oscillators 38; and, a limiter output which is coupled to a crystal filter 78. The output of the detector 74 is connected to a gate 76 which, when closed, passes the audio signal from the detector 74 to the audio amplifier 60 for application to the headset 62. When the crystal filter receives the frequency signal to which it is tuned, the signal is passed to a solid state switch 80 which is actuated to close the gate 76 to allow the detected signal to be applied to the amplifier 60. Said solid state switch also actuates a transmitter 82 in the student device. The information which modulates the transmitter frequency of transmitter 82 is coupled from the output of the audio amplifier 60, and the output of said transmitter 82 is connected to a transmit antenna 84. Each of the student transmitter assemblies has its crystal filter 78 tuned to a frequency different from the other receiver-transmitters. Therefore, the instructor can complete an intercom link between the console 10 and any single receiver-transmitter 20 by using the selector switch to choose the oscillator corresponding to the frequency of the crystal filter in the chosen student device. Transmission of an intercom oscillator signal which is identical to the crystal filter 78 in a student device 20 causes that student device to actuate its transmitter 82 so that all audio signals applied to the headset 62, including those picked up by the student's microphone 64, are applied to the transmitter 82 and transmitted by the RF link to the console 10. At the student station corresponding to the chosen oscillator frequency the student can hear comments from the instructor, and the instructor can hear the lesson and all comments made by the student, while none of the other students in the class can participate in the conversation since the other crystal filters do not actuate the solid state switches in the other student devices.

Preferably, frequencies of the intercom oscillators begin at 370 kHz. and occupy 500 Hz. intervals in continuing to 401.5 kHz., thereby providing a sufficient number of frequencies to permit a single console 10 to control 64 student stations and a plurality of lesson sources while occupying a relatively narrow frequency band.

A preferred circuit for the intercom portion of the student receiver-transmitter assembly, as illustrated in FIG. 5 which shows typical component values, comprises the RF amplifier 70 which is tuned to pass all frequencies from 370 kHz. to slightly over 400 kHz. The output of the RF amplifier is connected through the limiter circuit 72 to the detector 74 and the crystal filter circuit 78. The filter circuit 78 is designed to pass one of the 500 Hz. interval intercom frequencies transmitted by one of the console oscillators 38. Therefore, the crystal in the oscillator 38 is matched with the crystal 90 in one of the filters 78. When the filter 78 receives a frequency from the limiter 72 which is the same as the frequency of its crystal 90, then the filter 78 puts out a signal on a conductor 92 which is coupled to a transistor 94 included in the solid state switch 80. When the transistor 94 conducts, a negative voltage is present on its collector which is connected to a voltage regulator 96 and is also connected through a plurality of biasing resistors to cause a transistor 98 in the gate circuit 76 to conduct, thereby interconnecting the detector 74 and the audio amplifier 60. The voltage regulator circuit 96 applies a voltage level to bias the base of a transistor 100 in the transmitter 82 such that its associated oscillator will function and be modulated by the output of the audio amplifier 60.

It can be seen that in the system as shown in FIGS. 4 and 5 the instructor has the capability of simply monitoring the chosen student station without the student's knowledge. That is, by transmitting an unmodulated signal from one of the oscillators 38 the instructor effectively turns on the transmitter at the selected student station, but since no information comes through the intercom detector 74, the student remains unaware that the sounds, including his speech, that reach his headset are also transmitted through the antenna 84.

I claim:

1. A wireless teaching system comprising a control console having a plurality of lesson source means connected thereto, a plurality if transmitters at said console for transmitting RF signals modulated by the information on said lesson source means, a plurality of student receivers having tuning means for selectively receiving said transmitted RF signals and having detector means for retrieving the lesson information, a console receiver-transmitter means at said console including a plurality of signal sources having different frequencies, said signal sources being selectively coupled to the transmitter portion of said console receiver-transmitter means, and a student receiver-transmitter means at each said student receiver, said student receiver-transmitter means each having means sensitive to a respective one of said signal source frequencies for energizing said student receiver-transmitter means to receive information combined with said respective one of said signal source frequencies, and to transmit information back to said console.

2. The invention as set forth in claim 1 in which a long conductor is connected to the outputs of said console transmitters and said console receiver-transmitter to form an antenna positioned to form a loop to surround said student receivers.

3. A wireless teaching system comprising an instructor's receiver-transmitter means and a student's receiver-transmitter means spaced apart one from the other, lesson source means, a transmitter coupled to said lesson source means, an oscillator included in said instructor's receiver-transmitter means and having its frequency signal coupled to the transmitter portion thereof, the transmitter portion of said student's receiver-transmitter means having means sensitive to the transmitted frequency of said oscillator for energizing said transmitter portion of said student's receiver-transmitter means, the receiver portion of said student's receiver transmitter means being operable independently of said transmitter portion of said student's receiver-transmitter means whereby said student's receiver-transmitter means can selectively have its receiver portion operatively coupled to said transmitter for said lesson source and its receiver and transmitter portions operatively coupled to said instructor's receiver-transmitter means.

4. A wireless teaching system comprising first and second receiver-transmitter means, said first receiver-transmitter means including lesson source means coupled to channel transmitter means and an oscillator having its frequency signal coupled to the transmitter portion of said first receiver-transmitter means for transmitting information therewith, and said second receiver-transmitter means having means sensitive to the transmitted frequency of said oscillator for energizing said second receiver-transmitter means to permit intercommunication between said first and second receiver-transmitter means.

5. The invention as set forth in claim 4 in which said means sensitive to the transmitted frequency of said oscillator comprises an RF amplifier, a gate circuit having its output coupled to the transmitter input of said second receiver-transmitter means, a detector coupled between said RF amplifier and gate circuit for retrieving information transmitted with said oscillator frequency, a filter coupled to the output of said RF amplifier for passing the frequency of said oscillator, and a switch coupled to the output of said filter and being sensitive to an output signal therefrom for operating said gate circuit to pass the detected signal and for energizing the transmitter portion of said second receiver-transmitter means, first transducer means for converting the output signal from the gate circuit to a sound signal, and second transducer means for converting sound signals to electrical signals for coupling to said transmitter input and to said first transducer.

6. A wireless teaching system comprising an instructor's receiver-transmitter means and a plurality of student's receiver-transmitter means, lesson source means coupled to channel transmitter means, said instructor's receiver-transmitter means having signal source means selectively operable at any one of a plurality of frequencies for transmission of information therewith by said instructor's receiver-transmitter means, each of said student's receiver-transmitter means being sensitive respectively to a different one of said plurality of frequencies for energization to transmit and receive information to and from said instructor's receiver-transmitter means and to receive information from said lesson source means through said channel transmitter means.

7. The invention as set forth in claim 6 in which said instructor's receiver-transmitter means is connected to a loop antenna positioned to surround all of said student's receiver-transmitter means.

8. The invention as set forth in claim 6 in which said instructor's receiver-transmitter means is provided with a selector switch having a plurality of contacts for selectively energizing said signal source means.

9. The invention as set for in claim 6 in which all of said student's receiver-transmitter means are tuned to the same transmitting frequency.

10. The invention as set forth in claim 6 in which each said means sensitive to a signal source frequency comprises an RF amplifier, a gate circuit, a detector coupled between said RF amplifier and gate circuit for retrieving information transmitted with said oscillator frequency, transducer means for converting an output signal from said gate circuit to a sound signal, a narrow band filter coupled to the output of said RF amplifier for passing a particular oscillator frequency, and a switch which closes when there is an output signal from said filter, said switch being coupled to energize the transmitter of the second receiver-transmitter means with which it is associated and to operate said gate circuit to pass the detected signal.

11. A wireless teaching system comprising an instructor's receiver-transmitter means and a plurality of student's receiver-transmitter means, a plurality of oscillators in said instructor's receiver-transmitter means each having a different frequency and coupled to the transmitter portion thereof, each of said student's receiver-transmitter means having means sensitive to one of said frequencies of said oscillators, switch means at said instructor's receiver-transmitter means for selectively activating said oscillators to selectively energize any of said student's receiver-transmitter means to permit selective intercommunication between said instructor's receiver-transmitter means and any of said student's receiver-transmitter means, lesson source means, and means at each of said student's receiver-transmitter means for coupling the receiver portion of said student's receiver-transmitter means to said lesson source means irrespective of the positioning of said switch means.

12. A wireless teaching system comprising an instructor's receiver-transmitter means and a plurality of student's receiver-transmitter means, a plurality of oscillators in said instructor's receiver-transmitter means each having a different frequency and coupled to the transmitter portion thereof, each of said student's receiver-transmitter means having means sensitive to one of said frequencies of said oscillators, switch means at said instructor's receiver-transmitter means for selectively activating said oscillators to selectively energize any of said student's receiver-transmitter means to permit selective intercommunication between said instructor's receiver-transmitter means and any of said student's receiver-transmitter means, lesson source means operatively associated with each of said student's receiver-transmitter means, and means at each of said student's receiver-transmitter means for coupling the receiver portion of said student's receiver-transmitter means to the lesson source means associated therewith irrespective of the positioning of said switch means.

13. A wireless teaching system comprising an instructor's receiver-transmitter means and a plurality of student's receiver-transmitter means, a plurality of oscillators in said instructor's receiver-transmitter means each having a different frequency and coupled to the transmitter portion thereof, each of said student's receiver-transmitter means having means sensitive to one of said frequencies of said oscillators, switch means at said instructor's receiver-transmitter means for selectively activating said oscillators to selectively energize any of said student's receiver-transmitter means to permit selective intercommunication between said instructor's receiver-transmitter means and any of said student's receiver-transmitter means, first lesson source means having a transmitter coupled therewith, a plurality of second lesson source means operatively associated with each of said student's receiver-transmitter means, and means at each of said student's receiver-transmitter means for selectively coupling the receiver portion of said student's receiver-transmitter means to one of said first and second lesson source means irrespective of the positioning of said switch means.

References Cited
UNITED STATES PATENTS

| | | | |
|---|---|---|---|
| 2,112,877 | 4/1938 | Beverage | 343—227 X |
| 2,567,431 | 9/1951 | Halstead | 35—35 C UX |
| 3,122,847 | 3/1964 | Redfield et al. | 35—35 C |
| 3,200,516 | 8/1965 | Parker | 35—35 C |
| 3,387,212 | 6/1968 | Kaufman | 343—227 X |
| 3,474,451 | 10/1969 | Abel | 35—35 C X |

WILLIAM H. GRIEB, Primary Examiner

U.S. Cl. X.R.

325—15; 343—207